United States Patent
Chen

[19]

[11] Patent Number: 6,108,469
[45] Date of Patent: Aug. 22, 2000

[54] WAVELENGTH SELECTIVE RESONANT GRATINGS

[75] Inventor: Jerry Chia-yung Chen, Arlington, Mass.

[73] Assignee: Lucent Technologies Inc, Murray Hill, N.J.

[21] Appl. No.: 09/201,174

[22] Filed: Nov. 30, 1998

[51] Int. Cl.[7] .................................................. G02B 6/28
[52] U.S. Cl. ........................... 385/24; 385/16; 385/37; 385/27; 372/6; 359/127; 359/130
[58] Field of Search ................. 385/24, 37, 27, 385/16, 15, 39; 372/6, 22, 102; 359/127, 128, 130

[56] References Cited

U.S. PATENT DOCUMENTS

| | | | |
|---|---|---|---|
| 4,096,446 | 6/1978 | Haus et al. | 385/37 X |
| 4,726,031 | 2/1988 | Wakao | 372/96 |
| 5,283,686 | 2/1994 | Huber | 359/127 X |
| 5,479,082 | 12/1995 | Calvani et al. | 385/24 X |
| 6,041,070 | 3/2000 | Koch et al. | 372/6 |

OTHER PUBLICATIONS

T. Kimura and A. Sugimura, "Linewidth reduction by coupled phase–shift distributed–feedback lasers," *Electron. Letters*, Sep. 1987, 23, pp. 1014–1015.

S. Ogita et al., "Optimum design for multiple–phase–shift distributed feedback laser," *Electron. Letters*, Jun. 1988, 24, pp. 731–732.

G. P. Agrawal et al., "Distributed feedback lasers with multiple phase–shift regions," *Appl. Phys. Lett.*, Jul. 1988, 53, pp. 178–179.

H. A. Haus and Y. Lai, "Theory of cascaded quarter wave shifted distributed feedback resonators", *IEEE J. Quantum Electronics*, 1992, 28, pp. 205–213.

G.E. Kohnke, C. H. Henry, E. J. Laskowski, M. A. Cappuzzo, T. A. Strasser, and A. E. White, "Silica based Mach–Zehender add–drop filter fabricated with UV induced gratings," *Electronic Letters*, 1996, 32, pp. 1579–1580.

*Primary Examiner*—Phan T. H. Palmer
*Attorney, Agent, or Firm*—John A. Caccuro

[57] ABSTRACT

A wavelength selective resonant grating exhibits transmission resonances when a single gap between two sections of a split gratings is used to provide a phase shift which is not a quarter wavelength in length or $\pi/2$ in phase. When the phase is changed to non - $\pi/2$ values (or the gap differs from a quarter wave), the transmission resonance moves from the center of the stop band. Appropriate adjustments of the phase over a $\pi$ interval allow tuning of the resonance across the entire stop band. The resonant optical wavelength grating can, illustratively, be used as wavelength filter, wavelength monitor, or as part of an Add/Drop arrangement.

14 Claims, 6 Drawing Sheets

$$\text{PHASE} = \frac{\pi}{2} + m\pi$$

$$\text{LENGTH} = \frac{\lambda}{4} + m\frac{\lambda}{2}$$

| Phase $\Phi/\pi$ | resonant $\lambda$ (nm) | FWHM of resonance (nm) |
|---|---|---|
| 28.2 | 1544.904 | ± .05 |
| 29.0 | 1561.911 | ± .0200 |
| 29.5 | 1531.990 | ± .0360 |
| 28.8 | 1557.912 | ± .0120 |
| 28.5 | 1551.5035 | ± .0080 |
| 28.2 | 1544.919 | ± .0120 |
| 28.0 | 1540.593 | ± .010 |

WAVELENGTH SELECTIVE RESONANT GRATINGS

TECHNICAL FIELD OF THE INVENTION

This invention relates to optical gratings and, more particularly, to wavelength selective resonant gratings.

BACKGROUND OF THE INVENTION

The growth and diversity of lightwave networks is placing new demands on optical technology. In particular, wavelength-division multiplexed (WDM) networks require new optical circuits to enable capacity management and provisioning, maintenance, and reliable and robust operation. These optical circuits include wavelength multiplexing and demultiplexing at terminal sites and wavelength monitors for determining system performance.

Recently, Add/Drop multiplexers have been used to extract selected wavelength channels in a WDM signal and to add replacement channels positioned at the same wavelengths as the dropped channels. The use of wavelength multiplexing/demultiplexing of WDM signals avoids the use of electronic demultiplexing circuits to extract and inject local electronic traffic in networks that use time-division-multiplexed (TDM) optical signals.

Add/Drop multiplexers and wavelength monitors use wavelength filters to select the desired wavelength to be processed. These wavelength filters can be implemented using distributed feedback reflectors or gratings. In a distributed feedback reflector or grating, it is known that periodic modulation in the index of refraction creates a stop band. Stop bands are ranges of frequencies where the reflection is near unity or the transmission is substantially zero. If this grating is divided or separated in the middle such that the resulting gap is a quarter wavelength in length or $\pi/2$ in phase, then the sharp transmission resonance appears in the middle of the stop band. This wavelength selective resonant grating structure, shown in FIG. 1, is commonly known as a quarter wave shifted grating [2,3]. (Note, the reference number(s) identified in brackets, e.g., [2,3], indicates the position of those references in the attached Appendix). The nature of the transmission resonance is the same if the gap is any odd multiple of $\pi/2$ in phase [4,5].

There is a continuing need for further improvements in wavelength selective resonant gratings for use as wavelength filters in the various components of optical networks.

SUMMARY OF THE INVENTION

In accordance with the present invention, I have recognized that a resonant optical wavelength grating can exhibit transmission resonances when a single gap between two sections of a split gratings is used to provide a phase shift which is not a quarter wavelength in length or $\pi/2$ in phase. When the gap differs from a quarter wave, the transmission resonance moves from the center of the stop band. Appropriate adjustments of the phase over a $\pi$ interval allow tuning of the resonance across the entire stop band.

More particularly, my invention is directed to a resonant optical wavelength grating apparatus implemented using a single split grating which forms a stop band filter to a predetermined band of wavelengths of a received optical signal, the first and second sections of the split grating being separated by an optical delay path which produces a non-$\pi/2$ phase shift for a selected wavelength within the stop band so as to enable the transmission of that selected wavelength through the apparatus.

According to other aspects of the invention, the resonant optical wavelength grating apparatus can be part of an Add/Drop arrangement or a wavelength monitor. The optical delay path can be made variable optical delay path for selecting, in response to a control signal, the wavelength to be transmitted through the apparatus. The variable optical delay path may be implemented by changing the index of refraction or the physical path length.

DETAILED DESCRIPTION

In the following description, each item or block of each figure has a reference designation associated therewith, the first number of which refers to the figure in which that item is first described (e.g., 101 is first described in FIG. 1).

Figure 1:
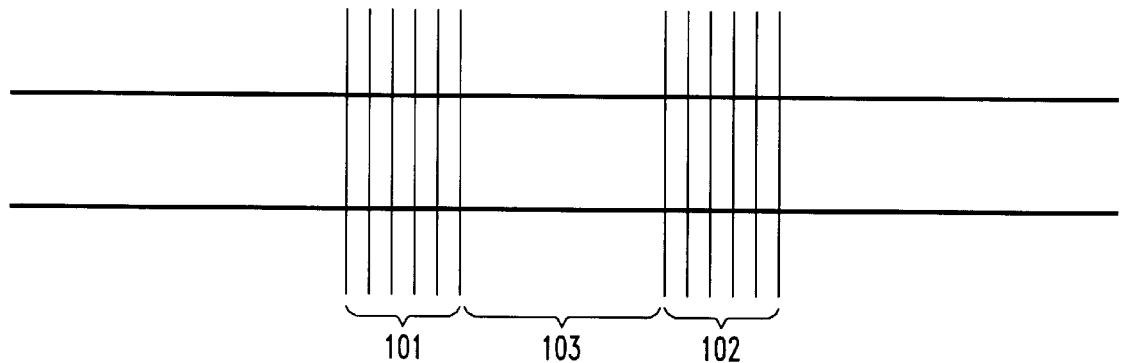
FIG. 1 shows an illustrative block diagram of a prior art split grating having a gap which is a quarter wavelength in length or providing a $\pi/2$ in phase shift.

FIG. 1 shows an illustrative block diagram of a prior art split grating. As shown the two sections of the split grating are 101 and 102 separated by the gap 103. The gap 103 is a quarter wavelength, or more generally $\lambda/4+m\lambda/2$, where m is an integer >0, or gap 103 produces a phase shift of $\pi(m+\frac{1}{2})$. This split grating produces a sharp transmission resonance in the middle of the stop band and is commonly known as a quarter wave shifted grating. This quarter wave concept was first applied to lasers[2,3,4,5]. Besides a gap whose length is a quarter of a wavelength, there are many other ways to obtain a $\pi/2$ phase shift: asymmetric tapers[7], chirped gratings[6], varying widths[7], phase jumps[8], different periods[9], and curved waveguides. The shape of the transmission resonance can be shaped by cascading the gratings[10]. In practical implementations, designers have modified such grating characteristics as its depth, period, width, index, etc. so the grating is no longer strictly periodic. Such chirping and apodization would perturb the grating's frequency properties. For example, people may wish to suppress side lobes, shape resonances, broaden stop bands, etc.

What is not commonly known is that resonances also occur when the gap between the two gratings is not a quarter wavelength in length or $\pi/2$ in phase. When the gap differs from a quarter wave, the transmission resonance moves from the center of the stop band. Appropriate adjustments of the phase over a $\pi$ interval allow tuning of the resonance across the entire stop band. Note that a phase difference of $\phi$ results in the same resonance as $\phi+2m\pi$, where m is an integer >0.

I have recognized that a resonant optical wavelength grating can exhibit transmission resonances when a single gap between two sections of a split gratings is used to provide a single phase shift which is not a quarter wavelength in length or $\pi/2$ in phase. While some non-$\pi/2$ phase shifts have been proposed [14–16], all of these non-$\pi/2$ phase shifts involved multiple phase shifts as opposed to my use of a single phase shift to provide this non-$\pi/2$ phase shift. A single phase shift uses two gratings separated by only one gap whereas multiple phase shifts involve multiple (M) gaps and at least M+1 gratings. Previously in resonant optical wavelength gratings, single phase shifts were used to produce only odd multiples of $\pi/2$.

Figure 2:
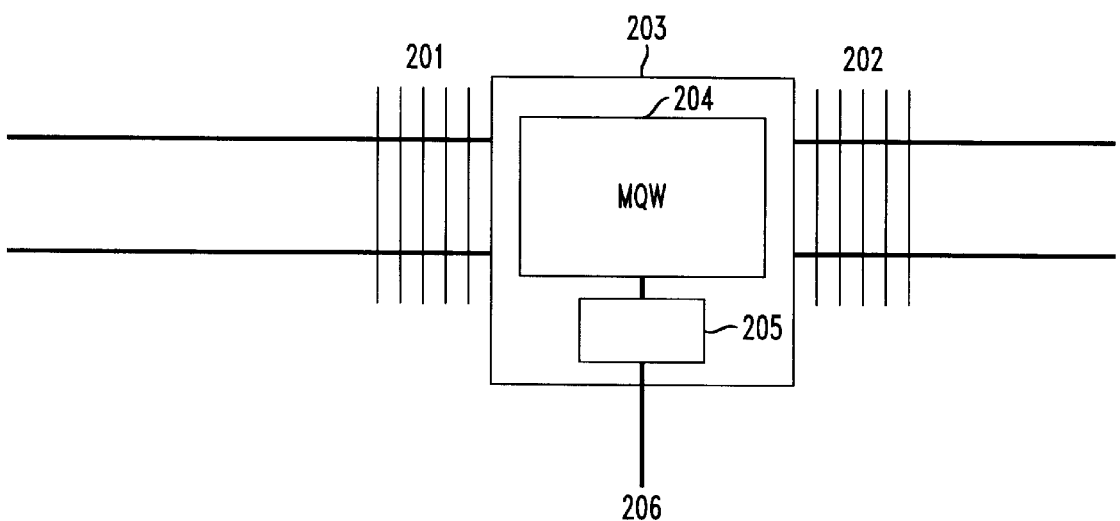
FIG. 2 shows my inventive wavelength selective resonant grating with a variable non-$\pi/2$ phase shift.

FIG. 2 shows my inventive wavelength selective resonant grating apparatus which uses a split grating with a variable non- $\pi/2$ phase shift. As shown, an optical phase shift element 203 is used to provide the variable phase $\phi$ between the sections 201 and 202 of the split grating. Illustratively, as will be described in a later paragraph, an index changeable device (which can be a MQW, electroabsorptive material, electro-optic material, thermal material, or carrier-heated material) 204 operable under control unit 205 controls the phase shift of element 203.

Figure 3:
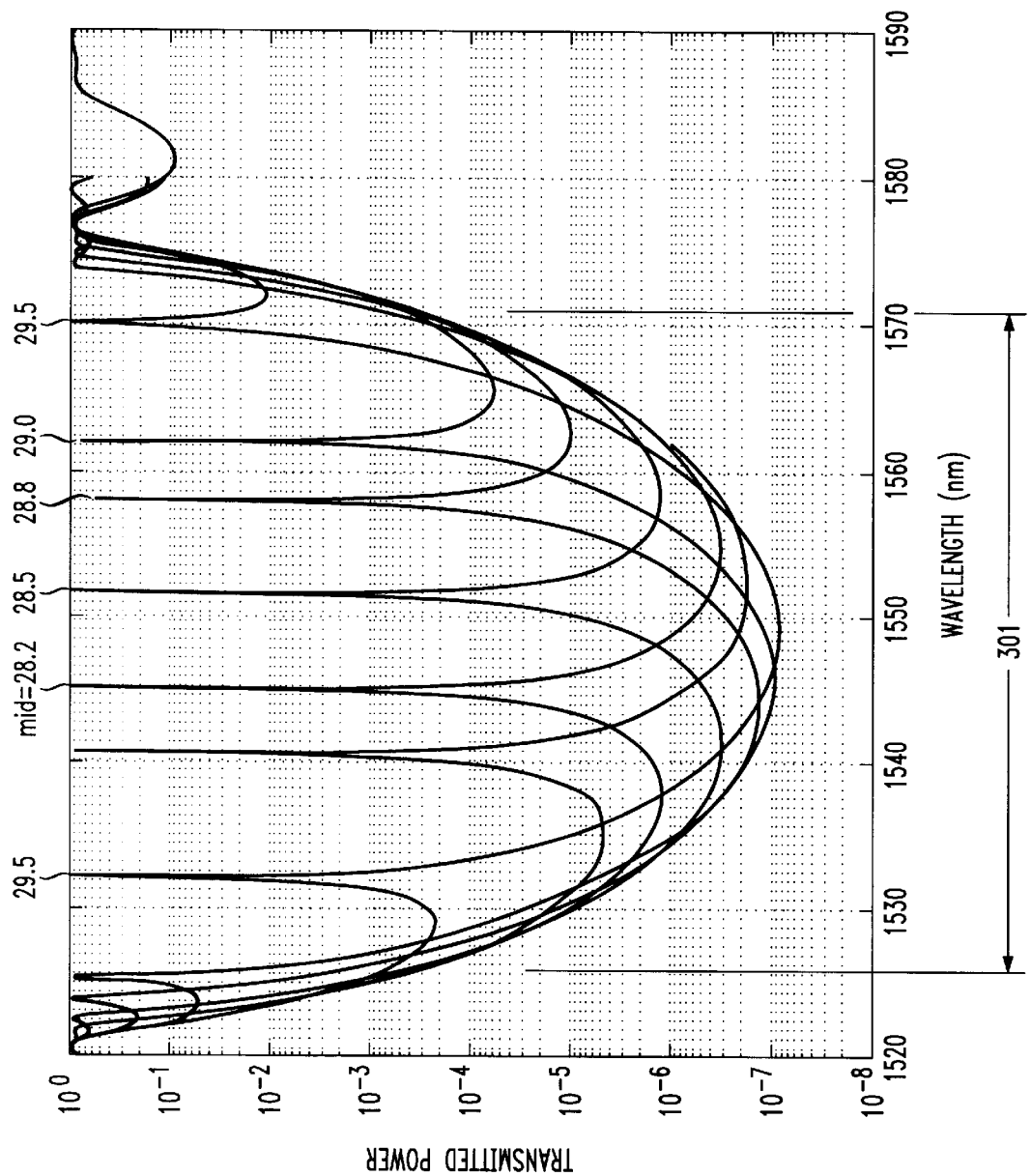
FIG. 3 shows an illustrative diagram of the transmitted power as a function of wavelength for various phase shifts.
Figures 4, 5:
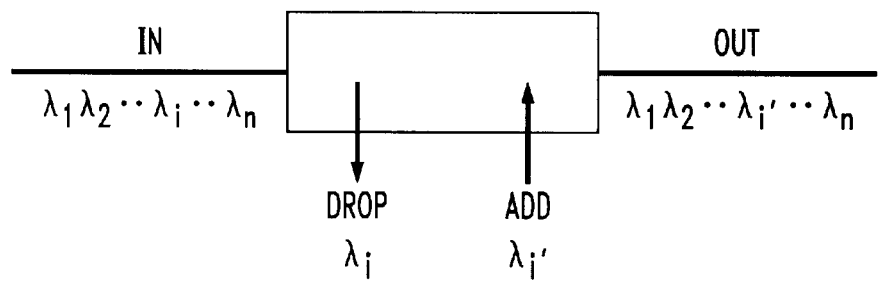
FIG. 4 shows a table showing illustrative values of the phase (in multiples of $\pi$), the resonance's wavelength, and the resonance's full-width-half-maximum (FWHM)
FIG. 5 shows a general diagram of an Add/Drop multiplexer.

FIG. 3 shows an illustrative diagram of the transmitted power through my wavelength selective resonant grating as a function of wavelength for various phase shifts. The stop band 301 is where the transmitted power is less than $10^{-3}$ of the input power and is shown to extend, approximately, between wavelengths 1525 nm and 1572 nm. The accompanying table, in FIG. 4, gives the phase $\phi$ (in multiples of $\pi$), for a selected group of wavelength resonances, and the resonance's full-width-half-maximum (FWHM). Note that other wavelengths can be selected by changing the $\phi/\pi$ ratio in phase shift element 203.

To achieve arbitrary phase shifts, the various techniques described in prior art can be used. In addition, the gratings can be modified and cascaded to shape the transmission passband. For example, chirping of the grating's period can be used to increase the frequency range of the stop band and the transmission resonance.

The phase shift of optical path element 203, can be changed by (1) changing the length of the path or (2) changing the refractive index of the path. The refractive index is affected by acoustic-optical effect, electro-optics effect, thermal heating and current injection. The index of refraction can also be modified by the presence of another optical signal by a variety of nonlinear effects such as (but not limited to) four wave mixing, optical pumping, Kerr effect, and Raman effect. The path length can be changed by bending or stretching or compressing or heating.

With reference to FIG. 2 again, there is shown a preferred embodiment of the invention. As shown, the phase shifting element 203 of FIG. 2 includes a InGaAsP multiple quantum well (MQW) device 204 in which the refractive index can be change using current injection or thermal heating via control unit 205. The control signal 206 is used to control the amount of current injection or thermal heating produced by unit 205 and, hence, the refractive index of the MQW device 204. In this manner, the control signal is used to select the phase shift of MQW device 204 and, consequently, the wavelength for transmission through the wavelength selective resonant grating apparatus of FIG. 2.

In MQW device 204, the phase is k L n where k is the propagation constant ($=2 \pi$/wavelength), L is length of material, and n is index of refraction. Semiconductor materials have refraction indices that range from 1.45 in glass to about 3.4 in GaAs or InP. The indices can't be changed by more than a few percent at best. If the original phase shift of MQW device 204 was 0.5 $\pi$, the resonance cannot be move much with a 1% change in index. As shown in FIG. 3, a $\phi/\pi$ ratio range of more than 29.5±1 is needed to move the resonance anywhere in the stopband. Since large tuning ranges of more than 1 $\pi$ is needed to select the desired wavelength, and since 1 $\pi$ can only be a few percent of the original base phase shift, the original base phase shift has to be huge. For example, if we have a 1% change to a total of 100 $\pi$ phase shift, then the change is 1 $\pi$ and we can move the resonance anywhere in the stopband.

If one wishes to have a large stop band as depicted in FIG. 3, one must use a strong grating where the index of refraction varies by several percent. If the index differences are that large, Fabry Perot effects may perturb the transmission profile. That means that one cannot use an arbitrarily long separation between gratings (to obtain a large phase shift), because Fabry Perot resonances occur at frequencies f=m c/(2 n L) where m is any integer and c is speed of light in vacuum. So, Fabry Perots favor small L's. The use of an L equal to 28 in FIG. 3 is just an illustrative value. The value of L is just a compromise between Fabry Perot limitations and achievable index changes.

The way to work around this is to apodize or taper the grating section or phase shift section so the boundary between is gradual. Another method is to use a weak grating with small index changes so the Fabry Perot effects are negligible.

Unfortunately, most MQWs are birefringent. Depending on how the gratings are etched or grown, gratings can also be birefringent. We can balance the two birefringences so they cancel. The other option is to use a non-birefringent grating and a non-birefringent MQW.

The tuning of the transmission resonance of my wavelength selective resonant grating apparatus of FIG. 2 (also referred to as a tunable filter), enables it to be used as an add/drop multiplexer (ADM). Such devices are useful in reconfiguring the capacity and signal routing needs of wavelength division multiplexed (WDM) optical fiber transmission systems.

Shown in FIG. 5 is a typical ADM, an optical signal containing many wavelengths comes into Input port. Light of a desired wavelength $\lambda_i$ is removed or "dropped" and sent to Drop port. Light of that wavelength $\lambda_i$ can be "added" at Add port. The added light $\lambda_i$ as well as the other wavelengths exit at Output port.

Figure 6:
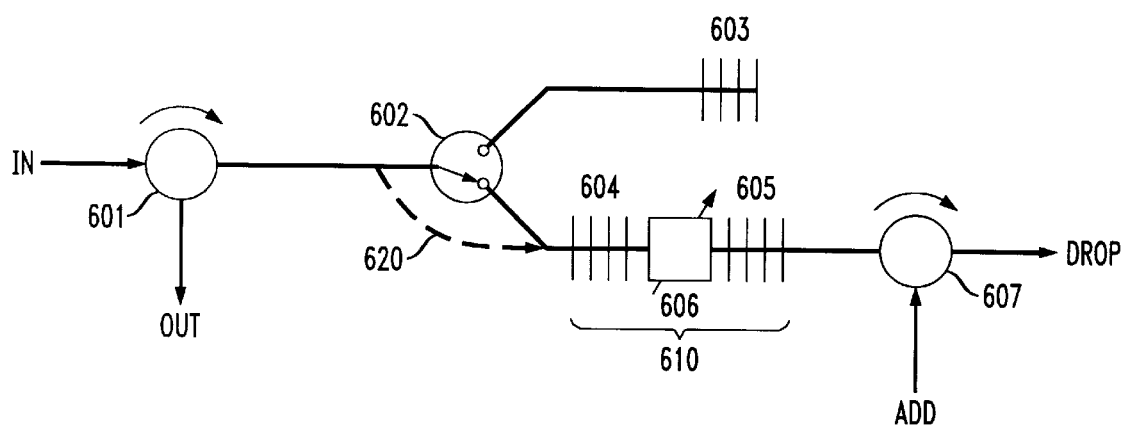
FIGS. 6 and 7 show different illustrative Add/Drop multiplexers in accordance with my invention.
Figure 7:
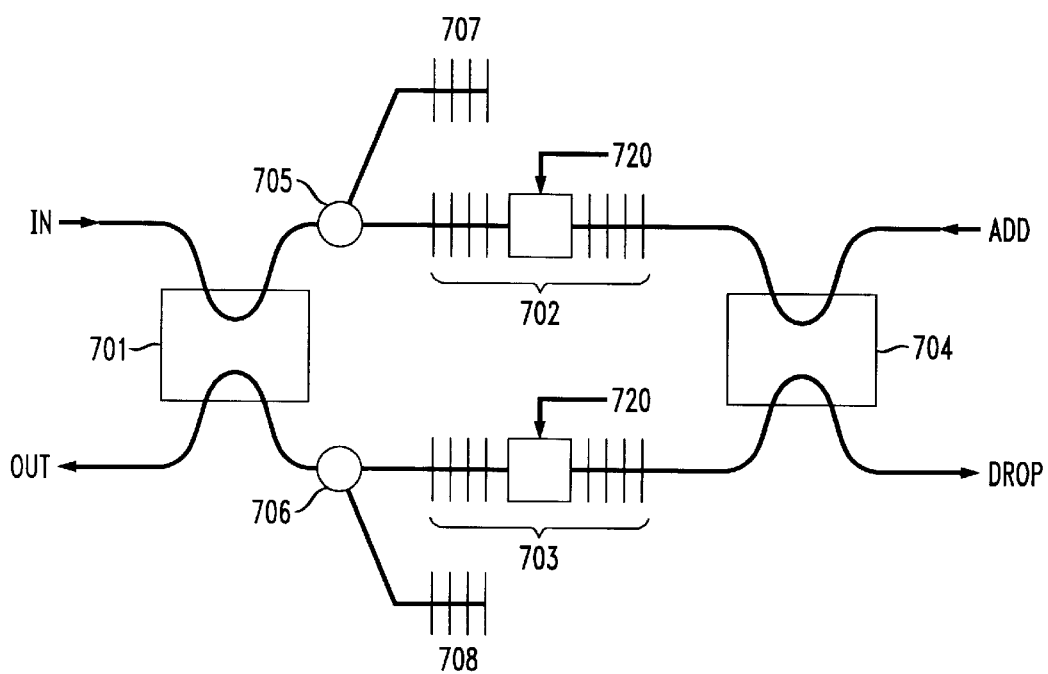

Shown in FIGS. 6 and 7 are two ADMs using my resonant gratings. FIG. 6 shows how circulators and gratings can be used for my WDM wavelength filters. This arrangement is similar to those shown in U.S. Pat. Nos. 5,283,686 and 5,479,082. With reference to FIG. 6, we first assume that the same wavelength is to be dropped and added. The WDM signal is received at the Input port and passes through circulator 601, via path 620, to my resonant grating 610. Here, all the wavelengths of the WDM signal except a predetermined wavelength, selected by the resonant grating 610, is reflected back through path 620 and circulator 601 and exits at Output port. The selected wavelength passes through the resonant grating 610 and circulator 607 and is outputted at the Drop port. A new selected wavelength signal is received at Add port and passes through circulator 607, resonant grating 610, path 620, circulator 601 and exits the Output port. The WDM signal at Output port is the same as the WDM signal received at the Input port except that a newly added selected wavelength has been substituted for the dropped selected wavelength.

Normally, in WDM systems, it is important to be able to switch wavelengths, e.g., $\lambda_i$ to $\lambda_K$, at an ADM without interrupting the traffic in other wavelength channels of the WDM signal. Unfortunately, tuning variable resonant grating 610 from $\lambda_i$ to $\lambda_K$, will affect all the wavelengths in between. In accordance with the present invention, a switch 602 is added (to replace path 620) to switch the WDM signal between resonant grating 610 and the mirror or grating 603 in response to a control signal 620. The control signal 620 would cause switch 602 to connect to switch to the mirror or grating 603 when there is to be a change in the wavelength to be selected by resonant grating 610. After the resonant grating 610 has been re-tuned from, e.g., $\lambda_i$ to $\lambda_K$, the WDM traffic is switched back to the resonant grating 610. In this manner different added and dropped wavelengths can be filtered by the same variable resonant grating 610.

Shown in FIG. 7 is an illustrative Mach Zehnder ADM arrangement similar but to that shown in reference 11. We first assume that the same wavelength is to be dropped and added. The WDM signal is received at the Input port, is split in a 50/50 coupler 701, and passes to the resonant gratings 702 and 703. At resonant gratings 702 and 703, all the wavelengths of the WDM signal except a predetermined wavelength, selected by the resonant gratings 702 and 703, are reflected back, and constructively recombine at the Output port of coupler 701. The selected wavelength passes through the resonant gratings 702 and 703 and are constructively recombined at the Drop port of coupler 704. A new selected wavelength signal is received at Add port, is split in 50/50 coupler 704, passes to the resonant gratings 702 and 703, and are constructively recombined at the Output port of coupler 701. The WDM signal at Output port is the same as the WDM signal received at the Input port except that a newly added selected wavelength has been substituted for the dropped selected wavelength.

To be able to switch wavelengths, e.g., $\lambda_i$ to $\lambda_K$, at an ADM of FIG. 7 without interrupting the traffic in other wavelength channels of the WDM signal, it is necessary to add a switches 705 and 706, mirrors or gratings 707 and 708, and requires that resonant grating s 702 and 703 be variable. This is because tuning the variable resonant gratings 702 and 703 from $\lambda_i$ to $\lambda_K$, will affect all the wavelengths $\lambda_i < \lambda < \lambda_K$ in between. The control signal 720 cause switches 705 and 706 to switch the signals from variable resonant gratings 702 and 703 to the mirrors or gratings 707 and 708, respectively, when there is to be a change in the wavelength to be selected by resonant gratings 702 and 703. After the resonant gratings 702 and 703 have been re-tuned, e.g., from $\lambda_i$ to $\lambda_K$, the WDM traffic is switched back to the resonant gratings 702 and 703. In this manner different dropped and added wavelengths can be selected by variable resonant gratings 702 and 703.

My resonant grating (or tunable filter) can also be used as an optical spectrometer or wavelength monitor, to measure the exact wavelength of an optical signal. This is useful for characterizing the frequency drift in WDM systems. By incorporating a feedback mechanism, it is then possible to set the frequency of the upstream lasers so the lasers are in the right frequency range. This prevents severe system degradation. Examples of how the resonant grating can be incorporated into a wavelength monitor device are shown in FIGS. 8–11.

Figure 8:
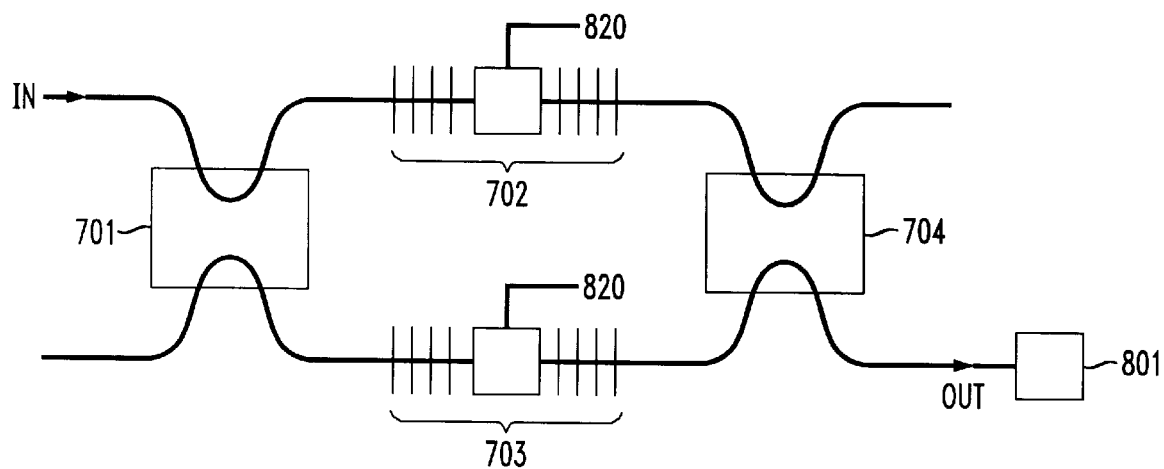
FIGS. 8 to 11 show different illustrative wavelength monitors in accordance with my invention.

Shown in FIG. 8 is an ADM that is similar in structure and operation to that of FIG. 7, except that a detector 801 is connected to the Drop port and no signal is inputted at the Add port. The control signal 820 selects the wavelength of resonant gratings 702 and 703.

Figure 9:
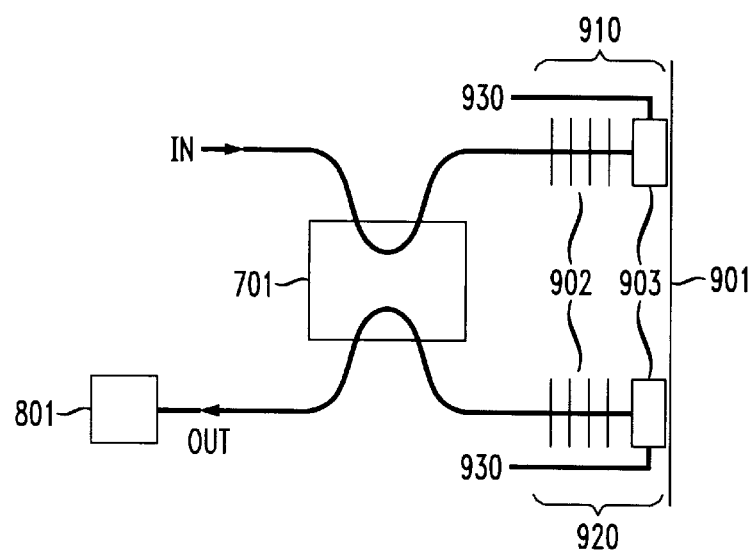

Shown in FIG. 9 is an ADM that takes advantage of the symmetry of the structure of FIG. 7. In FIG. 9, the mirror 901 enables that only the input coupler 701 and half of the resonant gratings 702 and 703 is needed. Thus, only the first half 902 and 903 of the split gratings (910 and 920) and phase shift elements 903 and 904 having only half of the delay are required. Since the signals pass through the phase shift elements 903 and 904 on their way out as well as after they have been reflected by mirror 901, the delay value of the phase shift elements 903 and 904 are cut in half. The reflected signals are constructively combined at the Output port of coupler 701. The control signal 930 selects the wavelength of resonant gratings 910 and 920.

Figure 10:
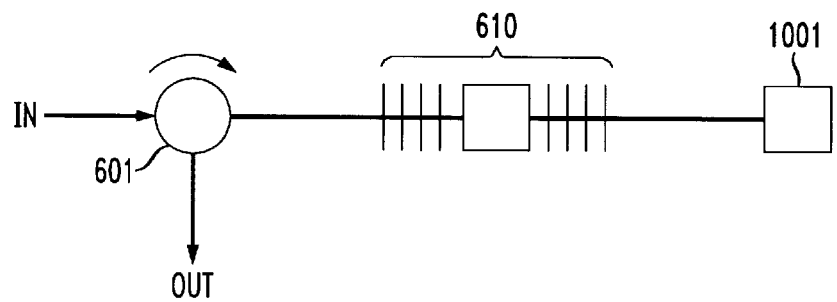

Shown in FIG. 10 is another monitor arrangement similar to FIG. 6 except without the switch 602, mirror 603, and circulator 607. The operation of FIG. 10 is essentially the same as that described for FIG. 6, except that the detector 1001 receives the selected wavelength signal. Other wavelengths are reflected to Output port. The control signal 1010 selects the wavelength of resonant grating 610.

Figure 11:
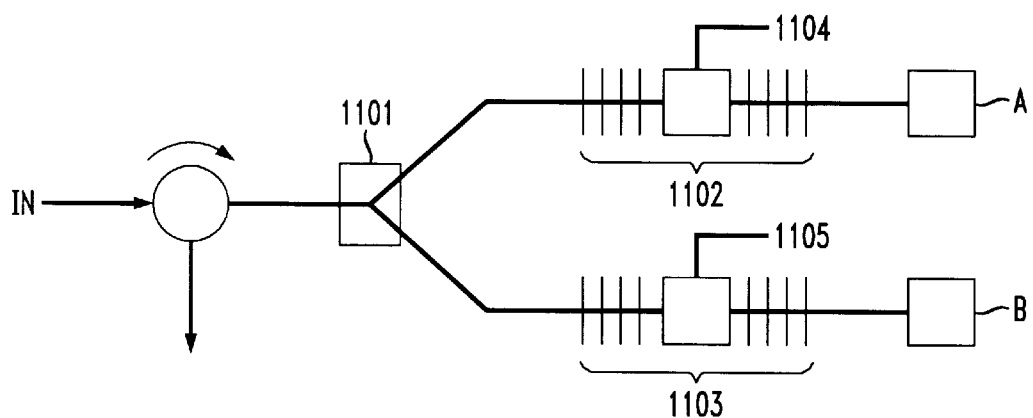
Figure 12:
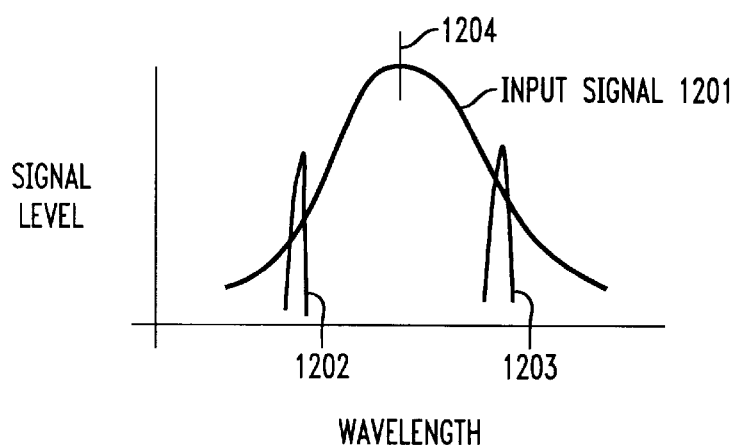
FIG. 12 shows a diagram of an illustrative use of the wavelength monitor of FIG. 11 to determine characteristics of signal waveforms.

When used as a monitor, the circuits of FIGS. 8–10 are operated as follows. First, set the selected resonant frequency in the resonant gratings (using the control signal), then measure the power at the detector. This gives the amount of light at the selected wavelength or frequency. Next, change the resonant frequency, using the control signal, and repeat the power measurement. If many wavelengths (or frequencies) are to be measured, this process can take a lot of time. The signal monitoring arrangement of FIG. 11, uses two wavelength monitors that are slightly displaced in frequency from each other. In FIG. 11, the 50/50 splitter 1101 sends the signals through resonant gratings 1102 and 1103 to detectors A and B. The control signals 1104 and 1105 select the wavelength of, respectively, resonant gratings 1102 and 1103. As shown in FIG. 12, if the shape of the input signal 1201 is known, then the ratio of the detected powers, 1202 and 1203 from the two monitors gives a prediction of the center wavelength 1204 as well as the strength of input signal 1201.

What has been described is merely illustrative of the application of the principles of the present invention. Hence, other arrangements can be implemented by those skilled in the art without departing from the spirit and scope of the present invention.

APPENDIX

References

1. H. Kogelnik and C. V. Shank, "Coupled-wave theory of distributed feedback lasers," *J. Applied Physics*, 1972, 43, pp.2327–35.
2. H. A. Haus and C. V. Shank, "Antisymmetric taper of distributed feedback lasers," *IEEE J. Quantum Electronics*, 1976, QE-12, pp.532–9.
3. H. A. Haus and C. V. Shank, U.S. Pat. No. 4,096,446, issued Jun. 20, 1978.
4. F. Koyama, Y. Suematsu, K. Kojima, K. Furuya, "1.5 μm phase adjusted active distributed reflector laser for complete dynamic single-mode operation," *Electronics Letters*, 1984, 20, pp.391–3.
5. K. Wakao and H. Soda, U.S. Pat. No. 4,726,031, issued Feb. 16, 1988.
5. A. Suzuki and K. Tada, "Theory and experiment on distributed feedback lasers with chirped gratings", *Proc. SPIE*, 1981, 239, pp. 532–9.
7. K. Tada, Y. Nakano, and A. Ushirokawa, "Proposal of a distributed feedback laser with nonuniform stripe for complete operation, *Electronic Letters*, 1984, 20, 82–4.

8. K. Sekartedjo, N. Eda, K. Furuya, Y. Suematsu, F. Koyama, and T. Tanbun-ek, "1.5 μm phase shifted DFB laser for single-mode operation," *Electronics Letters,* 1984, 20, pp. 80–1.
9. M. Okai, T. Tsuchiya, K. Uomi, N. Chinone, T. Harada, "Corrugation-pitch modulated MQW-DFB lasers with narrow spectral linewidth," *IEEE J. Quantum Electronics,* 1991, 27, pp. 1767–72.
10. H. A. Haus and Y. Lai, "Theory of cascaded quarter wave shifted distributed feedback resonators", *IEEE J. Quantum Electronics,* 1992, 28, pp. 205–13.
11. G. E. Kohnke, C. H. Henry, E. J. Laskowski, M. A. Cappuzzo, T. A. Strasser, and A. E. White, "Silica based Mach-Zehender add-drop filter fabricated with UV induced gratings," *Electronic Letters,* 1996, 32, pp. 1579–80.
12. T. Kimura and A. Sugimura, "Linewidth reduction by coupled phase-shift distributed-feedback lasers," *Electron. Letters,* September. 1987, 23, pp. 1014–1015.
13. S. Ogita et al., "Optimum design for multiple-phase-shift distributed feedback laser," *Electron. Letters,* June 1988, 24, pp. 731–732.
14. G. P. Agrawal et al., "Distributed feedback lasers with multiple phase-shift regions," *Appl. Phys. Lett.,* July 1988, 53, pp. 178–179

What is claimed is:

1. A resonant optical wavelength grating apparatus comprising
    a first section of a split grating for receiving an optical signal,
    a second section of the split grating, wherein the first and second sections of the split grating have a combined characteristic which forms a stop band filter to a predetermined band of wavelengths of the received optical signal, and
    an optical delay path, connected between the first and second sections, for producing a non- $\pi/2$ phase shift for a selected wavelength within the stop band so as to enable the transmission of the selected wavelength through the apparatus.

2. The apparatus of claim 1 wherein the optical delay path is a variable phase shift element for selecting, in response to a control signal, the wavelength to be transmitted through the apparatus.

3. The apparatus of claim 2 wherein the variable phase shift element produces a variable phase shift range of about $\pi$ degrees.

4. The apparatus of claim 2 wherein the variable phase shift element produces a total phase shift of range of $\pi$ (m+½), where m is an integer which enables variable phase shift element to have a phase shift variation range of about $\pi$ degrees.

5. The apparatus of claim 2 being part of an Add/Drop arrangement including a first circulator for providing the In and Out ports and a second circulator for providing the Add and Drop ports of the Add/Drop arrangement.

6. The apparatus of claim 5 further including
    an optical switch for switching an incoming optical signal at the In port of the Add/Drop arrangement to a mirror or grating and for outputting an optical signal reflected from the mirror or grating to the Out port of the Add/Drop arrangement, said optical switch activated prior to the variable optical delay path being adjusted to a different selected wavelength.

7. The apparatus of claim 2 wherein the variable phase shift element is changed by changing the length of the optical delay path.

8. The apparatus of claim 2 wherein the optical delay path includes an index changeable device.

9. The apparatus of claim 2 wherein the optical delay path includes phase shift producing material selected from a group including a multiple quantum well (MQW) device, acoustic-optical material, electroabsorptive material, electro-optic material, thermal material, photo sensitive material, and current injected material.

10. The apparatus of claim 1 being part of a Mach-Zehnder Add/Drop arrangement for the selected wavelength.

11. The apparatus of claim 1 being part of a Mach-Zehnder wavelength monitor arrangement for coupling the selected wavelength to an optical detector.

12. The apparatus of claim 1 being part of an Add/Drop arrangement including a first circulator for providing the In and Out ports and a second circulator for providing the Add and Drop ports of the Add/Drop arrangement.

13. The apparatus of claim 1 being part of a wavelength monitor arrangement including
    an optical detector for detecting the selected wavelength.

14. The apparatus of claim 1 being part of an optical signal monitoring arrangement for analyzing a received optical signal including
    a first resonant optical wavelength grating apparatus and a first optical detector for detecting a first selected wavelength of the received optical signal, and
    a second resonant optical wavelength grating apparatus and a second optical detector for detecting a second selected wavelength of the received optical signal.

* * * * *